US010422286B2

(12) United States Patent
Le Pache et al.

(10) Patent No.: US 10,422,286 B2
(45) Date of Patent: Sep. 24, 2019

(54) TURBINE ENGINE WITH EPICYCLIC REDUCTION GEAR TRAIN

(71) Applicant: SAFRAN AIRCRAFT ENGINES, Paris (FR)

(72) Inventors: Gwenolé Yann Le Pache, Dammarie-les-Lys (FR); Augustin Curlier, Boissise-la-Bertrand (FR); Clément Dupays, Melun (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 123 days.

(21) Appl. No.: 15/658,243

(22) Filed: Jul. 24, 2017

(65) Prior Publication Data

US 2018/0023483 A1 Jan. 25, 2018

(30) Foreign Application Priority Data

Jul. 25, 2016 (FR) ..................................... 16 57125

(51) Int. Cl.
  *F16H 1/28* (2006.01)
  *F16H 57/08* (2006.01)
  *F02C 7/36* (2006.01)
  *F02K 3/06* (2006.01)
  *F02C 7/32* (2006.01)

(52) U.S. Cl.
  CPC .................. *F02C 7/36* (2013.01); *F02C 7/32* (2013.01); *F02K 3/06* (2013.01); *F16H 1/28* (2013.01); *F05D 2220/76* (2013.01); *F05D 2260/40311* (2013.01); *F16H 57/082* (2013.01)

(58) Field of Classification Search
  CPC .......................... F05D 2260/40311; F02C 7/36
  See application file for complete search history.

(56) References Cited

U.S. PATENT DOCUMENTS

| 4,651,521 A | 3/1987 | Ossi |
| 2004/0255590 A1 | 12/2004 | Rago et al. |
| 2011/0148237 A1 | 6/2011 | Toot |
| 2015/0337677 A1 | 11/2015 | Roberge |

(Continued)

OTHER PUBLICATIONS

Rapport de Recherche Preliminaire, mailed Mar. 28, 2017, issued in corresponding French Application No. 1657125, filed Jul. 25, 2016, 6 pages.

*Primary Examiner* — Tisha D Lewis
(74) *Attorney, Agent, or Firm* — Christensen O'Connor Johnson Kindness PLLC

(57) ABSTRACT

A turbine engine equipped with an electrical apparatus with rotor and an epicyclic reduction gear train, includes a sun gear driven by a drive shaft about an axis of rotation, a ring gear surrounding the sun gear and configured to drive a fan shaft about the axis, and an annular row of planet gears interposed between the sun gear and the ring gear and held by a planet carrier fixed to a stator housing of the turbine engine. The stator of the electrical apparatus is fixed to the stator housing with an annular member for apparatus support. The annular member includes elongate legs that axially traverse the reduction gear. The annular member includes a first annular element for fixing to an annular flange integral with the stator housing. The stator of the apparatus has a first annular fixing flange connected integrally to opposed longitudinal extremities of the legs of the annular member.

11 Claims, 4 Drawing Sheets

(56) References Cited

U.S. PATENT DOCUMENTS

| | | | |
|---|---|---|---|
| 2015/0377142 A1* | 12/2015 | Sheridan | F02C 3/107 |
| | | | 60/778 |
| 2018/0016989 A1* | 1/2018 | Abe | F02K 3/06 |
| 2018/0051701 A1* | 2/2018 | Kupiszewski | F04D 25/06 |

* cited by examiner

TURBINE ENGINE WITH EPICYCLIC REDUCTION GEAR TRAIN

BACKGROUND

Embodiments of the present disclosure relate to a turbine engine equipped with an epicyclic reduction gear train. The prior art includes U.S. Patent Application Publication No. 2015/0337677 A1 to Roberge, and U.S. Pat. No. 4,651,521 to Ossi, both of which are hereby incorporated by reference in their entireties.

A twin-spool dual-flow turbine engine generally comprises a plurality of compressor stages, in particular a low-pressure (LP) compressor and a high-pressure (HP) compressor, which are disposed in the primary flow path of the engine. Upstream of the low-pressure compressor there is disposed a wheel with movable blades of large size, or fan, which supplies both the primary flow that passes through the LP and HP compressors and the cold flow, or secondary flow, which is directed directly towards a cold-flow nozzle, known as a secondary nozzle. The fan is driven by the rotary shaft of the LP body and usually rotates at the same speed as that shaft. However, it may be worth making the fan rotate at a lower rotation speed than that of the drive or LP shaft, particularly when the fan is very large, with the aim of improving its aerodynamic adaptation. For this purpose there is a reduction gear between the LP shaft and a fan shaft, which carries the fan.

Among the types of reduction gears used are epicyclic reduction gears, which have the advantage of offering significant rates of reduction in the speed of rotation, within limited amounts of space. These reduction gears are characterised by a sun gear which drives planet pinions that roll on an outer ring gear while rotating about planet spindles carried by a planet carrier.

Conventionally, an aircraft requires electrical energy and hydraulic energy from a turbine engine, as well as thrust. In traditional turbine engines, this power is taken off mechanically from the HP shaft in order to drive the input shaft of an accessory gear box (AGB) placed on a housing of the turbine engine. This input shaft is driven in rotation by a transmission shaft driven by a pinion integral with the HP shaft.

The current trend aims to increase the electrical power to be provided to the aircraft, and therefore the take-offs of mechanical power from the engine. Studies conducted previously have shown that a take-off of mechanical power performed entirely on the HP shaft was too restrictive from an engine operability point of view. This is because too high a take-off of mechanical power has a negative effect on the operability of the HP body, in particular when the engine is operating at low speed. The solution of a take-off of mechanical power distributed between the HP shaft and the LP shaft would largely allow engine performance and operability to be restored.

Mechanical distribution solutions exist (epicyclic gear train, two-speed accessory gearbox, clutch, etc.—see French publication FR 2882096 A1, for example) but they are problematic because of the size of the resultant single generator and the complexity of transmitting both speeds towards the space accommodating this generator. This is because recent engines tend to have thin nacelles, which means placing the AGB in the engine compartment (space between the primary flow path and the secondary flow path). As the volume of this zone is very limited, it is difficult to install one or more large generators there without having an impact on the lines of the secondary flow path and thus on the fuel consumption of the engine. In addition, this zone is close to the hot portions of the engine and so it limits the lifespan of the generators.

One of the lines of research for these engines is therefore to succeed in placing additional generators on the engine without having an impact on the aerodynamic lines. A generator can be "buried" in the turbine engine as in International Publication No. WO 2007/036202 A1, but this results in very complex maintenance and considerable environmental constraints. This is also the case for a generator installed in the tail cone or nose cone of a turbine engine.

One solution would be to install this generator in the fan, in the nose or upstream cone. The problem with such an installation would be the following: there is no fixed portion on which the stator can be made to rest in this space. The solutions would therefore be limited to:

either making a rotating stator, connecting the stator (or the rotor) to the LP shaft and the other to the HP shaft. In this way, electricity can be produced, but it is problematic to get it out. This is because the rotating contacts that allow the transition from a rotating point or marker to a fixed point or marker are often complex or voluminous or have a short lifespan. The gear trains could be routed to the inside of the HP shaft, but this involves bringing them out through the tail cone and therefore subjecting them to its environmental stresses. In French publication FR 3017413 A1, for example, the equipment (a pump) is installed inside bearings supporting the fan, upstream of the reduction gear and upstream of the fan. The drive speed of the pump is the difference in speed between the input and the output of the reduction gear. The configuration of the reduction gear involves a fixed ring gear and a movable planet carrier driving the fan in rotation;

or being able to bring an element of the housing inside the nose cone. In a conventional engine, the only way to do this would be to bring it via the rear of the engine through the HP shaft, but this has a large number of disadvantages (rigidity, weight, and exposure to the high temperatures of the tail cone).

Another solution would be to add a structure fixing the nose cone to the fan housing to hold the stator. In French publication FR 2919896 A1, a generator is fitted in the cone, the rotor of which is the LP shaft and the stator of which is a fixed element of the fan cowl. In a conventional engine, this cowl cannot be accessed from the interior of the nose cone. The solution described is the addition of radial stay arms between the nose cone and the fan housing.

Embodiments of the present disclosure bring in particular a simple, effective and economical solution to the above problem of the prior art, in the case of a turbine engine with an epicyclic reduction gear train.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments of the present disclosure propose a turbine engine, comprising at least one drive shaft having an axis of rotation A and configured to drive a fan wheel by means of an epicyclic reduction gear train, the reduction gear having:

a sun gear configured to be driven by the drive shaft about the axis A, a ring gear surrounding the sun gear and configured to drive a fan shaft about the axis A, and an annular row of planet gears interposed between the sun gear and the ring gear and held by a planet carrier fixed to a stator housing of the turbine engine, the turbine engine also having an electrical apparatus comprising a stator fixed to the stator housing of the turbine engine, and a rotor driven in rotation by the sun gear, characterised in that the stator of the electrical apparatus is fixed to the stator housing by means of an annular member for apparatus support, the annular member comprising legs of an elongated shape that axially traverse the reduction gear, the annular member comprising at longitudinal extremities of the legs a first annular element for fixing to an annular flange integral with the stator housing, and in that the stator of the apparatus comprises a first annular fixing flange connected integrally to opposed longitudinal extremities of the legs of the annular member.

Embodiments of the present disclosure apply to the particular instance of an epicyclic reduction gear train of which the planet carrier is fixed. The sun gear is driven in rotation by the rotor shaft, which allows the ring gear to be set in rotation with a reduction ratio corresponding to the ratio of the pitch diameters of the ring gear and the sun gear. The stator of the apparatus is connected to the stator housing of the turbine engine by the planet carrier. Its rotor is driven in rotation by the sun gear and is advantageously integral therewith, so as to be driven by the rotor shaft of the turbine engine by means of the sun gear.

Embodiments of the present disclosure propose an axially compact solution for fixing the stator of the apparatus, by means of the first annular element which axially traverses the reduction gear.

The turbine engine according to embodiments of the present disclosure comprise one or a plurality of the following features, taken separately from one another or in combination with one another:
    the rotor of the electrical apparatus is integral in rotation with the sun gear;
    the apparatus is coaxial with the reduction gear, upstream therefrom, and extends preferably substantially radially inside the fan shaft;
    the sun gear comprises an upstream axial extension, preferably substantially frustum-shaped, of which a free upstream extremity comprises means, preferably with crowned splines, for coupling with a corresponding free extremity of the rotor of the apparatus;
    the coupling means comprise splines of the crowned type so as to allow misalignments between the sun gear and the rotor in operation;
    the first annular element has a second annular fixing flange;
    the second flange is fixed to a third flange of a second annular element which is connected to first longitudinal extremities of elongated-shape fingers for supporting the planet carrier;
    the second and third flanges are fixed by nut-and-bolt type means to the element integral with the stator housing of the turbine engine, the stator housing preferably being an intermediate housing;
    the stator of the apparatus is fixed by means of a frustum-shaped collar to the annular member for apparatus support;
    the stator of the apparatus comprises, at a longitudinal extremity, the first flange and carries, at an opposed longitudinal extremity, a guide bearing;
    the guide bearing is fitted inside a substantially cylindrical collar that surrounds a sealing cap and comprises a fourth annular flange configured to be fixed to the fan shaft;
    the ring gear of the reduction gear is fixed to the shaft of the fan wheel.

Embodiments of the present disclosure also relate to a method for dismounting a turbine engine electrical apparatus with rotor as described above, characterised in that it comprises the steps consisting of:
    removing the sealing cap and the collar, by axial translation from the side opposite the apparatus;
    removing the apparatus, by axial translation from the side opposite the reduction gear.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1:
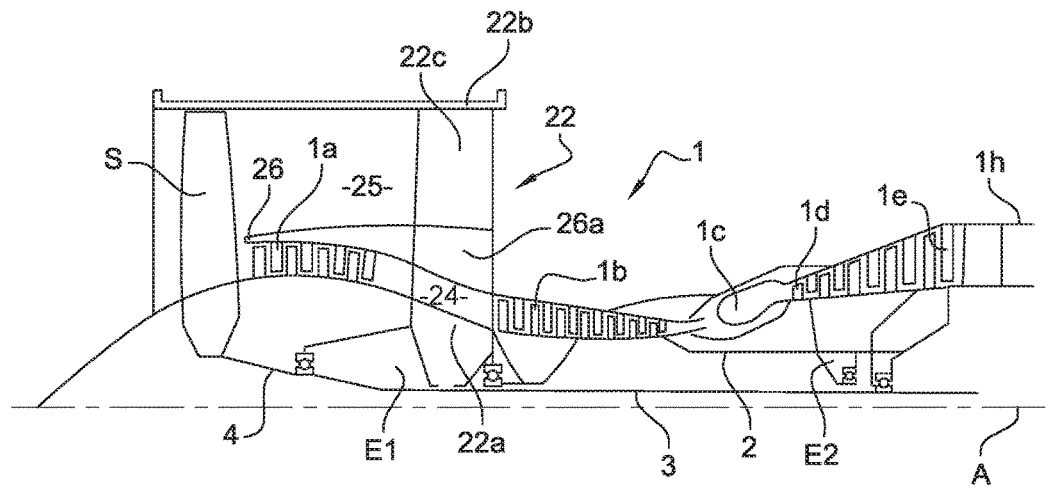
FIG. 1 is a very diagrammatic half-view of a turbine engine.

Embodiments of the present disclosure are described on the basis of specific examples and with reference to the drawings, but such embodiments should not be limited thereby. The drawings described are only schematic and are not limiting.

In the context of the present document, the terms "first" and "second" are used only to differentiate the different elements and do not imply an order between these elements. In the drawings, identical or similar elements may have the same reference signs.

With reference to FIG. 1, a turbine engine 1 can be seen, of a twin-spool dual-flow turbojet type that has, conventionally, upstream and downstream (in the direction of flow of gases along the longitudinal axis A of the turbine engine), a fan S, a low-pressure compressor 1a, a high-pressure compressor 1b, a combustion chamber 1c, a high-pressure turbine 1d, a low-pressure turbine 1e and an exhaust nozzle 1h.

The high-pressure compressor 1b and the high-pressure turbine 1d are connected by a high-pressure shaft 2 and with it they form a high-pressure (HP) body. The low-pressure compressor 1a and the low-pressure turbine 1e are connected by a low-pressure shaft 3, also called a drive shaft, and with it they form a low-pressure (LP) body.

In the configuration shown, which relates to a conventional turbojet engine, without a reduction gear, the disc on which the blades of the fan S are mounted is driven by a fan shaft 4, or LP trunnion, which is itself driven directly by the LP shaft 3. In the case where a reduction gear is positioned between the LP shaft 3 and the fan shaft 4, this gear is, in a known manner, an epicyclic reduction gear train.

An epicyclic reduction gear train (referenced 10 in FIG. 2) comprises a sun gear 12 with axis of rotation A, which drives pinions or planet gears 14 which roll on an outer ring gear 16 while rotating about planet spindles 18 carried by a planet carrier 20. In the configuration represented diagrammatically in FIG. 2, which shows the operational kinematics of a turbine engine with an epicyclic gear train, the sun gear 12 is driven in rotation by the LP shaft 3, the planet carrier 20 is connected in a fixed manner to a stator housing 22 (such as an intermediate housing) of the turbine engine, and the ring gear 16 drives the fan shaft 4 in rotation.

FIG. 1 shows an example of an intermediate housing 22. This type of housing comprises a hub 22a and a collar 22b surrounding the hub and connected thereto by substantially radial arms 22c traversing the primary and secondary flow paths 24, 25 respectively. The primary flow or hot flow is that which flows inside the engine 1, from the LP compressor 1a to the LP turbine 1e and the nozzle 1h, and the secondary flow or cold flow flows around the engine 1. The flow of air which enters the turbine engine and which passes through the fan S is divided by an annular separator 26 into a radially inner portion that enters the LP compressor 1a forming the primary flow, and a radially outer portion that forms the secondary flow. A downstream extension 26a of the separator 26 is carried by the arms 22c of the intermediate casing.

Figure 2:
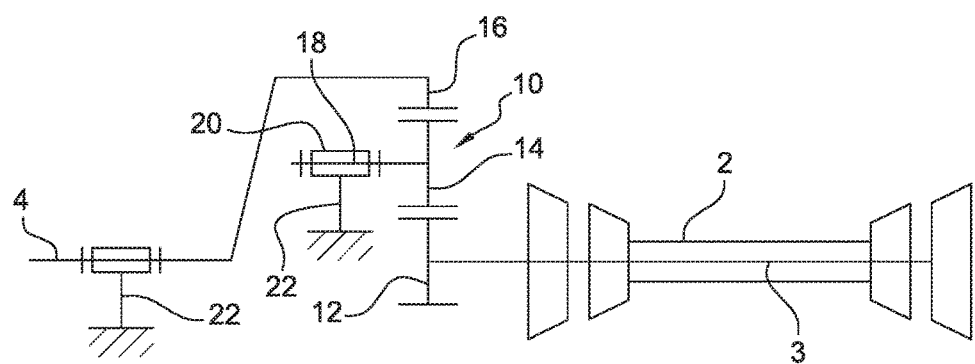
FIG. 2 is a simplified diagram representing the operational kinematics of a turbine engine with an epicyclic gear train.
Figure 3:
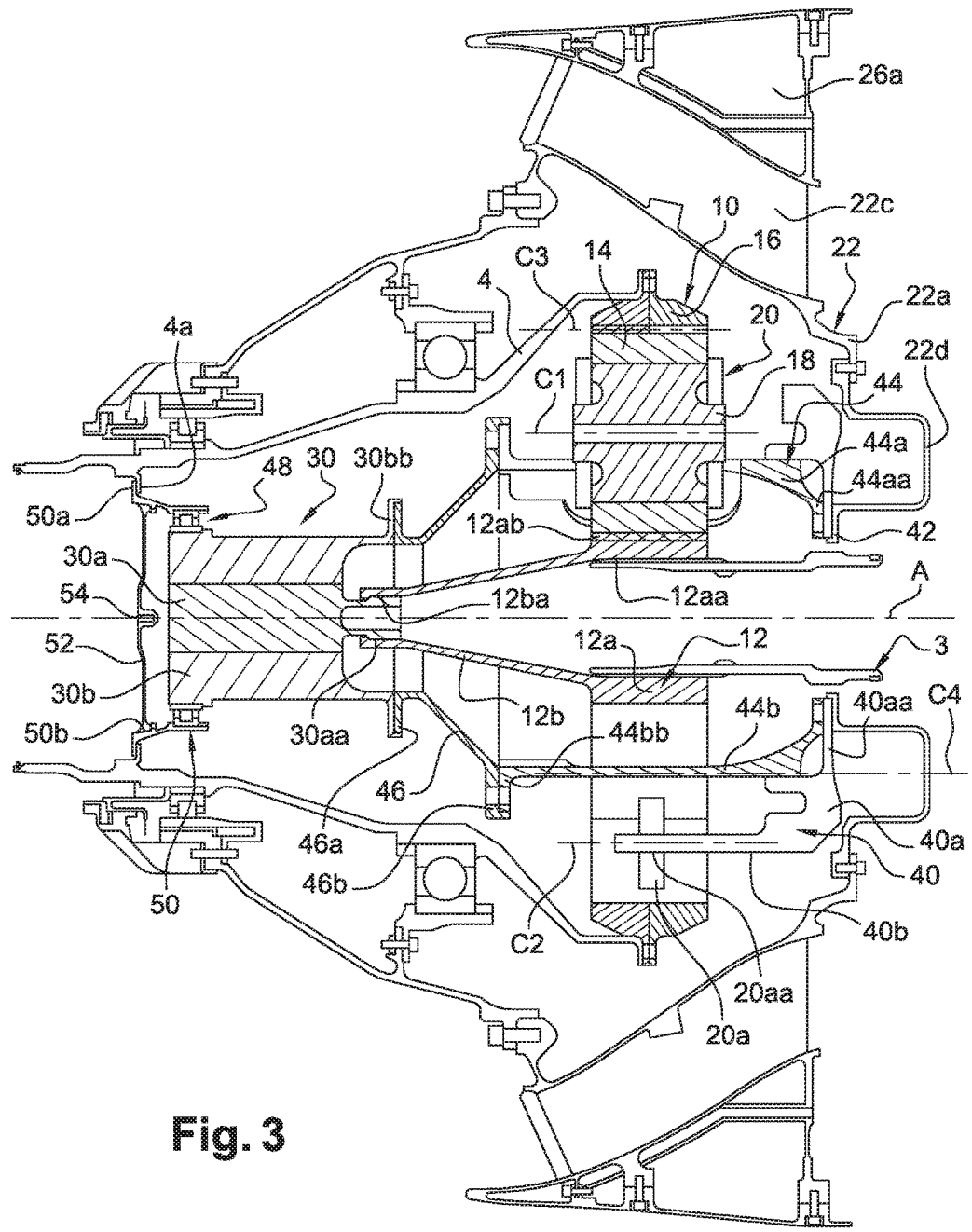
FIG. 3 is a partial diagrammatic view in axial cross section of a turbine engine according to embodiments of the present disclosure.

FIG. 3 shows an embodiment of a turbine engine according to embodiments of the present disclosure which, as in the example in FIG. 2, comprises an epicyclic reduction gear train 10, of which:
 the sun gear 12 is driven in rotation by a drive shaft of the turbine engine, in this instance the LP shaft 3,
 the ring gear 16 drives the fan shaft 4 in rotation, and
 the planet carrier 20 is fixed and integral with a stator housing of the turbine engine, which in the example shown is the intermediate housing 22.

The turbine engine also has an electrical apparatus 30 with a rotor 30a. The stator 30b of the electrical apparatus 30 is fixed to the stator housing mentioned previously (the intermediate housing 22 in the example) by means of the planet carrier 20, and to drive in rotation the rotor 30a of the apparatus 30 by connecting it to the sun gear 12. The rotor 30a of the electrical apparatus 30 is preferably made integral in rotation with the sun gear 12 by a coupled connection, that is to say that the rotor 30a and the sun gear 12 rotate at the same speed, as explained below with reference to the embodiment shown in FIG. 3.

However, it is still possible to provide a geared connection between the rotor 30a and the sun gear 12, so that the rotor 30a rotates at a different speed from the rotation speed of the sun gear 12 which is that of the drive shaft (the LP shaft 3) of the turbine engine. It can in particular be advantageous to drive the rotor of the electrical apparatus 30 at a higher speed than the rotation speed of the LP shaft 3. The geared connection can consist of an epicyclic gear train with a fixed planet carrier, interposed between the reduction gear 10 and the electrical apparatus 30, the ring of which is fixed to the sun gear 12 and the sun gear of which is fixed to the rotor 30a.

With reference to the embodiment shown in FIG. 3, the sun gear 12 has an elongated tubular shape and comprises a substantially cylindrical downstream portion 12a and with axis of revolution A, and a coaxial, substantially frustum-shaped upstream portion 12b. The portion 12b widens from upstream to downstream. The downstream portion 12a comprises longitudinal inner splines 12aa intended to cooperate by meshing with complementary splines of the LP shaft 3 or of a coupling shaft between the sun gear and the LP shaft. The upstream portion 12b comprises, at its free upstream extremity of smaller diameter, rectilinear inner splines 12ba intended to cooperate by meshing with complementary splines 30aa of a downstream longitudinal extremity of the rotor 30a of the apparatus 30. The splines 12ba and 30aa are preferably of the crowned type so as to allow misalignments between the sun gear 12 and the rotor 30a of the apparatus 30 in operation. These crowned splines do not require an axial stop device.

The downstream portion 12a also comprises outer splines 12ab for meshing with the planet gears 14 which themselves mesh with the ring gear 16. The ring gear 16, the planet gears 14 and the downstream portion 12a of the sun gear are stacked inside one another in a substantially radial plane relative to the axis A.

The planet gears 14 can be three, four or five in number, or even more, for example. Each planet gear 14 is fitted rotatably on a spindle 18 which is carried by the planet carrier 20, which is itself fixed.

Figure 4:
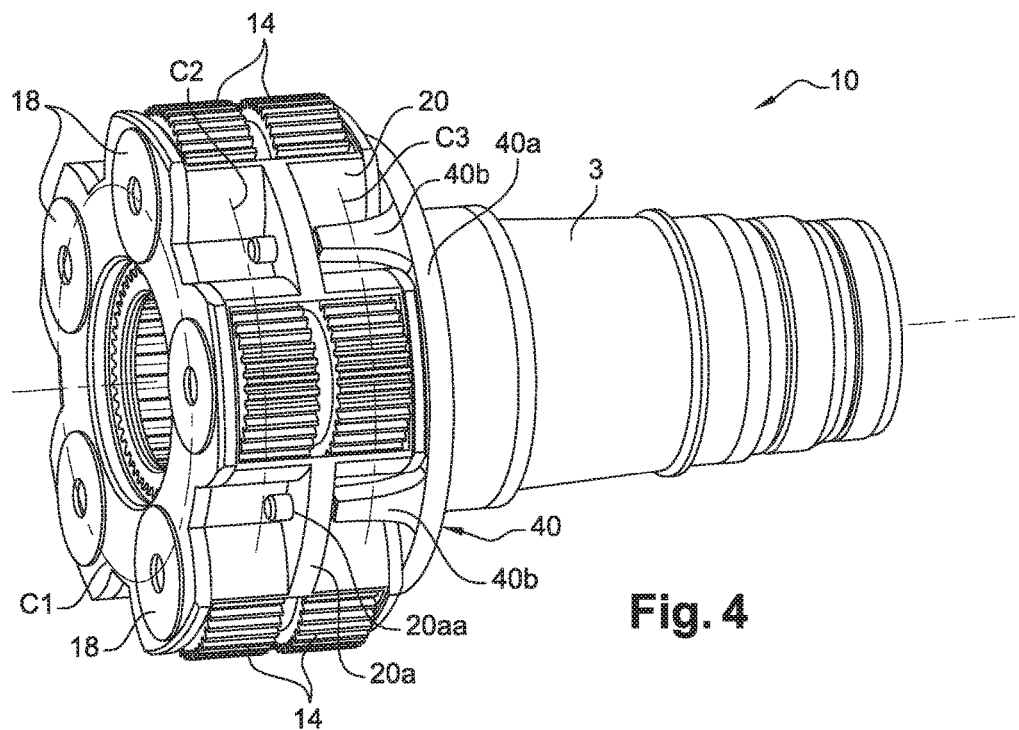
FIG. 4 is a partial diagrammatic perspective view of an epicyclic reduction gear train.

FIG. 4 shows an example (partially represented) of a reduction gear 10 with five planet gears 14. The planet carrier 20 has an annular shape and comprises seats for accommodating the planet gears 14 and which are traversed by the spindles 18. Between two adjacent planet gears 14, the planet carrier 20 comprises a transverse rib 20a in which an axial opening 20aa (FIGS. 3 and 4) is formed. The set of ribs 20a of the planet carrier forms an annular collar. In the example shown, the spindles 18 of the planet gears 14 are situated on a circumference C1 with a diameter less than the circumference C2 passing through the openings 20aa of the ribs 20a, the diameter of the circumference C2 being less than the diameter of a circumference C3 running around the outer periphery of the planet carrier 20 and of the planet gears 14.

As mentioned above, the planet carrier 20 here is fixed. It is fixed to the housing—an intermediate housing 22 in the example mentioned above—by means of a first annular member 40 which can be seen in FIGS. 3 and 4.

This first member 40 comprises a downstream annular element 40a which comprises a radially inner annular flange 40aa. The first member 40 further comprises an annular row of longitudinal fingers 40b, which extend upstream in line with the outer periphery of the annular element 40a. Each finger 40b passes through one of the aforementioned openings 20aa in the planet carrier 20 and can be held therein by appropriate means. The number of fingers 40b is thus equal to the number of openings 20aa, which is equal to the number of planet gears 14.

The annular flange 40aa is applied axially against an annular flange 42 formed with the intermediate housing 22, or with an annular element 22d integral with the intermediate housing 22 (FIG. 3) and for example integral with its hub 22a. In every case, the annular flange 42 is integral with the stator housing of the turbine engine. The flanges 40aa, 42 are fixed to one another by nut-and-bolt type means which are not shown.

Figure 5:
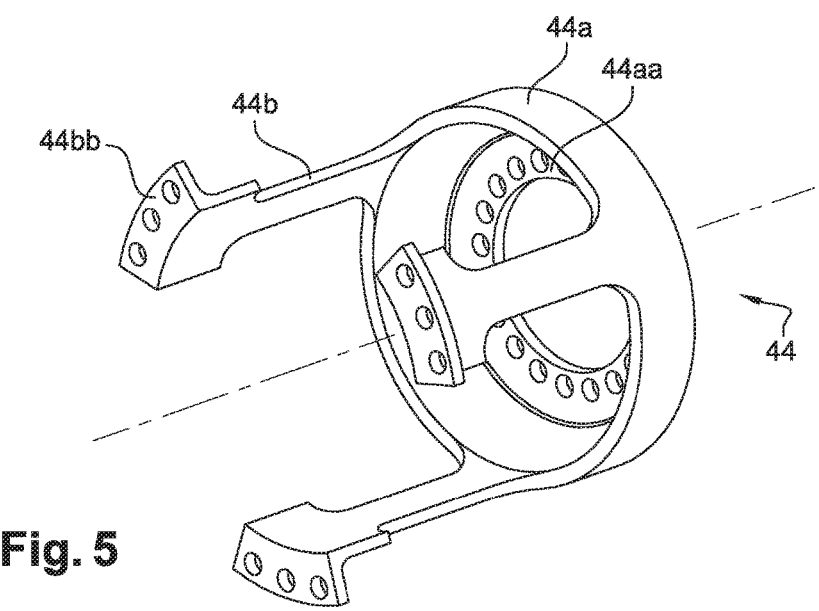
FIG. 5 is a diagrammatic perspective view of a support member for an apparatus stator.

A second annular member 44, also called an annular member for apparatus support, is fixed to these flanges 40aa, 42. This second member 44, which can be seen in FIGS. 3 and 5, serves to support the stator 30b of the apparatus 30. It comprises a downstream annular element 44a which comprises a radially inner annular flange 44aa. The second member 44 also comprises an annular row of longitudinal legs 44b, which extend upstream in line with the outer periphery of the annular element 44a. In the example shown, the second member 44 comprises three longitudinal legs 44b, and is thus adapted for a reduction gear 10 with three planet gears 14. As can be seen in FIG. 3, the legs 44b pass axially through the reduction gear 10. Each leg 44b comprises at its upstream free longitudinal extremity a mounting foot 44bb in the shape of a flange sector or segment.

The legs 44b are situated on a circumference C4 of a diameter less than that of the circumference C1 on which the spindles 18 of the planet gears 14 are situated. The legs are arranged so as to pass axially through the reduction gear 10 without making contact with the reduction gear, and in particular without being able to come into contact with the planet carrier 20 even when during operation the annular member 44 for apparatus support is subjected to quite significant vibrations coming from the apparatus. In this way, the path of forces between the apparatus 30 and the stator housing 22 of the turbine engine does not pass through the planet carrier 20; the latter is therefore not subjected to stresses or vibrations coming from the apparatus 30. This arrangement prevents significant misalignments of the spindles 18 of the planet gears 14 which would be capable of being damaged for the lifespan of the toothings of the planet gear pinions 14, the sun gear 12 and the outer ring gear 16 of the reduction gear 10.

The flange 40aa is interposed between the flanges 44aa and 42. The mounting feet 44bb of the legs 44b are fixed to a radially outer annular flange 46b of a frustum-shaped collar 46. The collar 46 extends about the axis A upstream of the reduction gear 10. It widens from upstream to downstream. The flange 46a is situated at the downstream extremity of the collar 46, and its upstream extremity comprises another radially outer annular flange 46a for fixing to the stator 30b of the electrical apparatus 30. In this way, the stator 30b of the apparatus 30 is fixed to the stator housing 22 of the turbine engine by means in particular of the frustum-shaped collar 46 and the annular member 44 for apparatus support.

The apparatus 30 has a generally cylindrical shape with axis A. It is therefore coaxial with the reduction gear 10 and is here fitted upstream thereof. The stator 30b surrounds the rotor 30a in the example shown. The rotor 30a can be guided directly inside the stator 30b by, for example, a system of a plain bearing type. In a variant, it can be guided and held in position axially by bearings. The stator 30b is tubular in shape and comprises at its downstream extremity an annular flange 30bb onto which the flange 46a of the collar 46 is applied axially and fixed by nut-and-bolt type means or similar.

The stator 30b comprises at its upstream extremity an outer cylindrical surface for mounting a bearing 48 for supporting the apparatus 30. The bearing 48 comprises an inner ring fitted to the stator 30b and an outer ring integral in rotation with a collar 50. The bearing 48 enables an unstable position of the equipment on the stator to be eliminated.

The collar 50 extends around the upstream extremity of the apparatus 30 and is fixed to the fan shaft 4. The collar 50 comprises at its upstream extremity a radially outer annular flange 50a applied axially from the upstream direction to a radially inner annular flange 4a of the fan shaft 4. The flanges 4a, 50a are fixed to one another by, for example, nut-and-bolt type means.

A cover 52 with a substantially circular periphery is fitted inside the collar 50, from the upstream direction, and comprises at its periphery annular sealing means intended to cooperate with an inner cylindrical surface 50b of the collar 50, situated upstream of the bearing 48. The cover 52 is coaxial with the apparatus 30 and comprises substantially at its centre a recess 54 intended to cooperate with a tool for fitting/removing the cover, by translation along the axis A.

Figure 6:
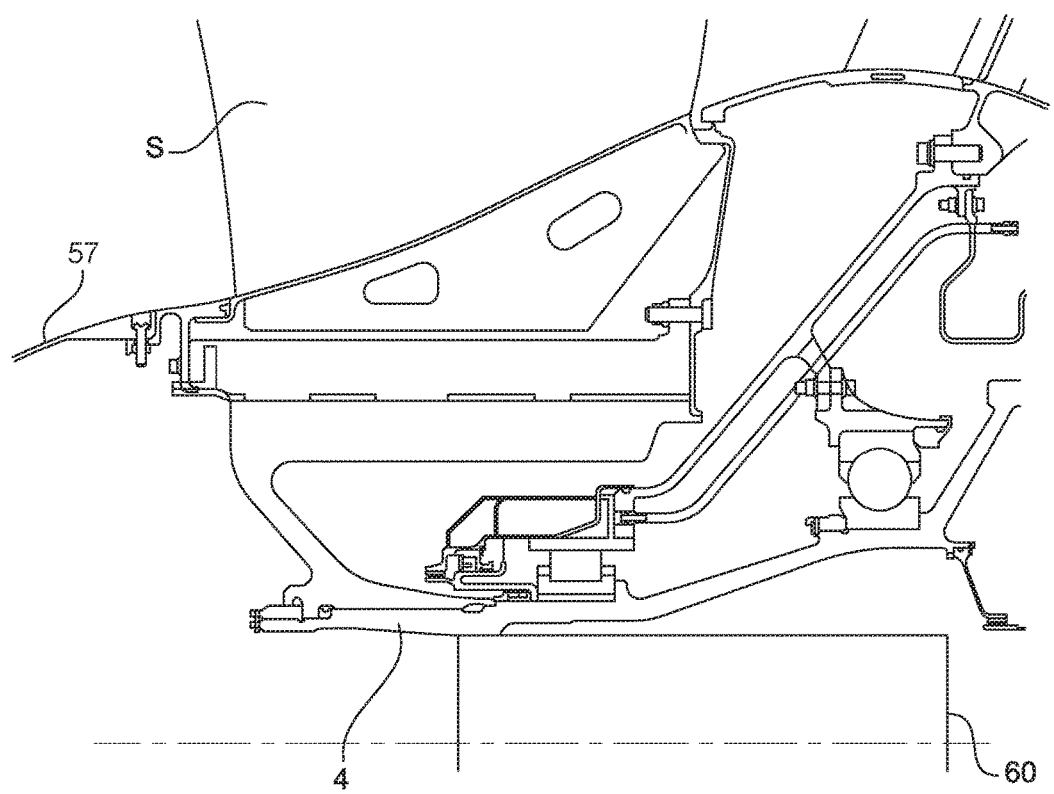
FIG. 6 is another partial diagrammatic view in axial cross section of the turbine engine according to embodiments of the present disclosure.

It can be observed in FIGS. 3 and 6 (the assembly consisting of the reduction gear 10, the apparatus 30, the collar 50 and the cover 52 being represented diagrammatically in FIG. 6 by a rectangle 60) that the portion of the fan shaft 4 situated upstream of the flanges 4a, 50a, has a diameter greater than the flange 50a and the cover 52.

FIGS. 3 and 6 make it possible to observe that the removal of the upstream cone 57 (FIG. 6) from the turbine engine allows access firstly to the cover 52, with a view to its extraction by axial translation in an upstream direction, and also to the collar 50 and to the bearing 48, which can also be withdrawn together by axial translation in an upstream direction after the flanges 4a, 50a have been disconnected. All that is then required is to disconnect the flanges 30bb, 46a so that the apparatus 30 can be withdrawn by axial translation in an upstream direction, the coupling via the splines 30aa, 12ba allowing this removal.

FIG. 6 also makes it possible to observe that the apparatus is accommodated radially inside the fan shaft 4 and at least in part inside the fan S.

While illustrative embodiments have been illustrated and described, it will be appreciated that various changes can be made therein without departing from the spirit and scope of embodiments of the present disclosure.

The embodiments of the invention in which an exclusive property or privilege is claimed are defined as follows:

1. A turbine engine comprising at least one drive shaft having an axis of rotation and configured to drive a fan wheel by means of an epicyclic reduction gear train, said reduction gear train having:
   a sun gear configured to be driven by said drive shaft about said axis,
   a ring gear surrounding the sun gear and configured to drive a fan shaft about said axis, and
   an annular row of planet gears interposed between the sun gear and the ring gear and held by a planet carrier fixed to a stator housing of the turbine engine,
   said turbine engine also having an electrical apparatus comprising a stator fixed to said stator housing of the turbine engine, and a rotor driven in rotation by said sun gear,
   wherein said stator of said electrical apparatus is fixed to said stator housing by means of an annular member for apparatus support, said annular member comprising legs of an elongated shape that axially traverse said reduction gear train, said annular member comprising at longitudinal extremities of the legs a first annular element for fixing to an annular flange integral with said stator housing, and wherein said stator of the apparatus comprises a first annular fixing flange connected integrally to opposed longitudinal extremities of the legs of the annular member.

2. The turbine engine according to claim 1, wherein the rotor of the electrical apparatus is integral in rotation with said sun gear.

3. The turbine engine according to claim 1, wherein said apparatus is coaxial with said reduction gear, upstream therefrom, and extends substantially radially inside said fan shaft.

4. The turbine engine according to claim 2, wherein said sun gear comprises an upstream axial extension of which a free upstream extremity comprises means for coupling with a corresponding free extremity of said rotor of the apparatus.

5. The turbine engine according to claim 4, wherein said coupling means comprise crowned splines so as to allow misalignments between said sun gear and said rotor in operation.

6. The turbine engine according to claim 1, wherein said first annular element has a second annular fixing flange which is fixed to a third flange of a second annular element which is connected to first longitudinal extremities of elongated-shape fingers for supporting said planet carrier.

7. The turbine engine according to claim 6, wherein said second and third flanges are fixed by nut-and-bolt means to the element integral with said stator housing of the turbine engine.

8. The turbine engine according to claim 1, wherein the stator of the apparatus is fixed by means of a frustum-shaped collar to the annular member for apparatus support.

9. The turbine engine according to claim 1, wherein said stator of the apparatus comprises, at a longitudinal extremity, said first flange and carries, at an opposed longitudinal extremity, a guide bearing.

10. The turbine engine according to claim 9, wherein said guide bearing is fitted inside a substantially cylindrical collar that surrounds a sealing cap and comprises a fourth annular flange configured to be fixed to said fan shaft.

11. Method for dismounting an electrical apparatus with rotor of a turbine engine according to claim 10, comprising steps consisting of:

removing the sealing cap and the collar, by axial translation from the side opposite the apparatus, and removing the apparatus, by axial translation from the side opposite the reduction gear.

* * * * *